US010108962B1

(12) United States Patent
Sadaghiani et al.

(10) Patent No.: US 10,108,962 B1
(45) Date of Patent: *Oct. 23, 2018

(54) SYSTEM AND METHODS FOR DYNAMIC DIGITAL THREAT MITIGATION

(71) Applicant: Sift Science, Inc., San Francisco, CA (US)

(72) Inventors: Fred Sadaghiani, San Francisco, CA (US); Alex Paino, San Francisco, CA (US); Jacob Burnim, San Francisco, CA (US); Keren Gu, San Francisco, CA (US); Gary Lee, San Francisco, CA (US); Noah Grant, San Francisco, CA (US); Eugenia Ho, San Francisco, CA (US); Doug Beeferman, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,761

(22) Filed: Apr. 19, 2018

Related U.S. Application Data

(63) Continuation of application No. 15/653,373, filed on Jul. 18, 2017, now Pat. No. 9,978,067.

(Continued)

(51) Int. Cl.
*H04L 29/06* (2006.01)
*G06Q 20/40* (2012.01)
(Continued)

(52) U.S. Cl.
CPC ... *G06Q 20/4016* (2013.01); *G06F 17/30598* (2013.01); *G06N 99/005* (2013.01); *G06F 21/50* (2013.01)

(58) Field of Classification Search
None
See application file for complete search history.

(56) References Cited

U.S. PATENT DOCUMENTS

| 2006/0064740 A1* | 3/2006 | Kelley | G06F 21/577 726/3 |
| 2011/0178942 A1* | 7/2011 | Watters | G06Q 10/06 705/325 |

(Continued)

*Primary Examiner* — Eric Chen
(74) *Attorney, Agent, or Firm* — Jeffrey Schox; Padowithz Alce

(57) ABSTRACT

Systems and methods include: implementing a first machine learning model to generate an output of a global digital threat score for an online activity based on an input of the collected digital event data; implementing a second machine learning model that generates a category inference of a category of digital fraud or a category of digital abuse from a plurality of digital fraud or digital abuse categories; selecting a third machine learning model from an ensemble of digital fraud or digital abuse machine learning models based on the category inference generated by the second machine learning model, wherein the ensemble of digital fraud or digital abuse machine learning models comprise a plurality of disparate digital fraud or digital abuse category-specific machine learning models; and implementing the selected third machine learning model to generate a digital fraud or digital abuse category-specific threat score based on the digital event data.

17 Claims, 6 Drawing Sheets

Related U.S. Application Data

(60) Provisional application No. 62/533,564, filed on Jul. 17, 2017.

(51) Int. Cl.
  *G06N 99/00* (2010.01)
  *G06F 17/30* (2006.01)
  *G06F 17/00* (2006.01)
  *G06F 11/00* (2006.01)
  *G06F 12/14* (2006.01)
  *G06F 12/16* (2006.01)
  *G06F 21/50* (2013.01)

(56) References Cited

U.S. PATENT DOCUMENTS

| | | | |
|---|---|---|---|
| 2011/0225650 A1* | 9/2011 | Margolies | G06F 21/554 726/22 |
| 2012/0101927 A1* | 4/2012 | Leibon | G06Q 40/00 705/35 |
| 2012/0144492 A1* | 6/2012 | Griffin | G06F 21/56 726/25 |
| 2015/0373043 A1* | 12/2015 | Wang | G06F 21/552 706/12 |
| 2017/0193515 A1* | 7/2017 | Sharan | G06Q 20/4016 |
| 2017/0270526 A1* | 9/2017 | Fitzgerald | G06Q 20/4016 |
| 2017/0357807 A1* | 12/2017 | Harms | G06F 21/562 |
| 2018/0096230 A1* | 4/2018 | Luan | G06K 9/6272 |
| 2018/0097826 A1* | 4/2018 | Luan | H04L 63/1416 |

\* cited by examiner

Request Global Digital Threat Score S210

Collecting Digital Event Data S220

Generating Global Digital Threat Score S230

Generating Specific Digital Threat Score S240

Generating Specific Digital Threat Scores for Cognate Abuse Types S250

Implementing Digital Threat Mitigation Protocols S260

FIGURE 2

SYSTEM AND METHODS FOR DYNAMIC DIGITAL THREAT MITIGATION

CROSS-REFERENCE TO RELATED APPLICATIONS

This application is a continuation of U.S. patent application Ser. No. 15/653,373, filed on 18 Jul. 2017, and claims the benefit of U.S. Provisional Application Ser. No. 62/533,564, filed on 17 Jul. 2017, which are incorporated in their entireties by this reference.

TECHNICAL FIELD

This invention relates generally to the digital fraud and abuse field, and more specifically to a new and useful system and method for detecting digital fraud or digital abuse in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
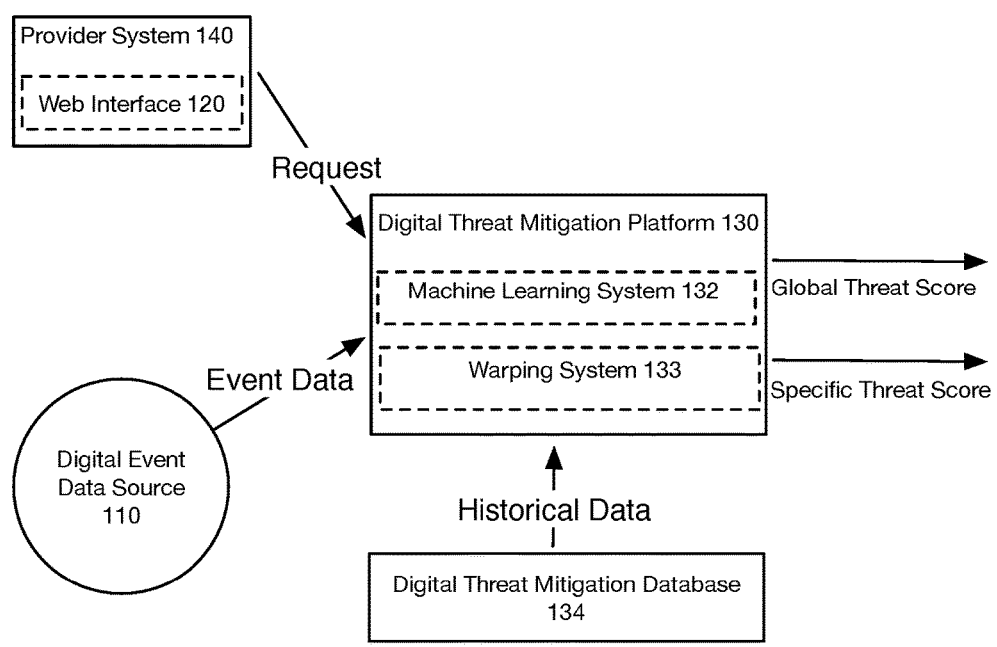
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web and parse from these great number of digital activities and events a subset of these activities and events that present the greatest likelihood of involving digital fraud and/or digital abuse. Accordingly, using these finely tuned and perpetually tunable machine learning models, a system implementing the several embodiments of the present application can predict and/or estimate with high accuracy and, in some embodiments, in real-time (e.g., as the event is occurring or shortly thereafter) a digital threat score for each event or activity that is sifted by the system.

The digital threat score may be exposed via a score application program interface (API) that may function to interact with various endpoints of the digital threat mitigation platform. Specifically, the score API may function to interact with one or more web computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, recognizing that in some circumstances service providers that provide online and/or digital resources to users may need to mitigate or prevent multiple forms of digital fraud and/or digital abuse simultaneously, the embodiments of the present application enable the generation of a global digital threat score and a plurality of specific digital threat scores for varying, known digital fraud or abuse types. Accordingly, while the global digital threat score may indicate to the service provider a general indication of the existence of digital fraud and/or digital abuse in digital events data, the specific digital threat scores for the plurality of digital abuse types function to specifically identify a type of fraud or abuse that is being committed in a digital events dataset. These specific indications allow the service provider and/or the digital threat mitigation platform to implement digital threat mitigation or prevention actions that effectively address the specific digital fraud or abuse.

1. System for Digital Fraud and/or Abuse Detection

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores.

2. Method for Digital Fraud and/or Abuse Detection

As shown in FIG. 2, the method 200 includes receiving a request for a global digital threat score S210, collecting digital event data S220, generating a global digital threat score S230, generating specific digital threat score for a digital abuse type S240, identifying one or more cognate digital abuse types and generating a plurality of digital threat scores for a plurality of cognate digital abuse types S250. The method 200 optionally includes implementing one or more digital threat mitigation protocols S260.

The method 200 functions to detect multiple types of digital threats and correspondingly generate digital threat scores for each type of digital threat, preferably, based on an input of a single stream of digital event data from a service provider. The method 200 enables a service provider to provide digital event data collected in association with activities performed with its services to a digital threat mitigation platform together with an identification of one or more specific types of digital threats that the service provider desires to prevent in its services. The digital threat mitigation platform, which may perform one or more steps or processes of the method 200, may function to use a machine learning system to infer or predict a likelihood that activities and/or users associated with the digital event data may include one or more of the specific types of digital threats. Additionally, or alternatively, the method 200 may function to detect additional types of digital threats beyond the types of digital threats detected by the service provider and similarly, generate digital threat scores providing valuable digital threat prevention insight to a service provider.

S210, which includes receiving a request for a global digital threat score, functions to enable the digital threat mitigation platform to receive from a remote service provider a request for a global threat score. The service provider preferably initiates the request via a web interface accessible via one or more web servers of the digital threat mitigation platform. Depending on contents of the request from the service provider, one or more digital threat detection and/or evaluation processes may be automatically triggered at the digital threat mitigation platform.

At S210, the request for the global digital threat score may be a multipart request that includes a primary request for the global digital threat score along with additional sub-requests for digital threat scores for specific types of digital threats. The global digital threat score, as requested by the service provider, may generally relate to a broad score generated by the digital threat mitigation platform that indicates a general likelihood that activities performed via the online services of the service provider and/or that a user utilizing the online services of the service provider may be a digital threat (e.g., a general fraud score). Accordingly, the requested global digital threat score, in some embodiments, may be agnostic with respect to a specific type or sub-category of digital threat (e.g., payment abuse, misappropriated payment method, or an abuse of service provider policy, etc.). That is, in such embodiments, the global digital threat score and possibly the underlying machine learning model predicting this score may not be specifically designed or configured to deliver an actual category of bad activity that is being perpetrated in activities of the digital event data or by a user identified in the digital event data.

However, the additional sub-requests in S210 function to inform the digital threat mitigation platform of the service provider's desire to obtain more granular scoring of its stream of digital event data. Thus, in addition to the automatic implementation of a primary digital threat scoring system, the additional sub-requests in S210 may function to automatically trigger the implementation (or activation) of one or more additional machine learning models that may be specific to the additional sub-request (e.g., money laundering machine learning evaluation model, etc.). That is, upon the detection by the digital threat mitigation platform of the additional sub-requests, the digital threat mitigation platform may instantiate multiple additional and differentiated machine learning models (in addition to the primary machine learning model) to generate scoring for associated specific types of digital threats.

S220, which includes collecting digital event data, functions to collect digital event data to be used as input into a digital threat machine learning system. In response to receiving the request for a global digital threat score, S220 may collect digital event data from one or more data sources associated with the service provider making the request. Additionally, or alternatively, S220 may function to collect global digital event data from a global digital event databank or the like that includes digital event data from a plurality of different sources other than the service provider making the request.

In one variation of S220, contemporaneously or at a same time of making the request for the global digital threat score, the service providing making the request may transmit (e.g., via a network or the like), from one or more data repositories of the service provider to the digital threat mitigation platform, the digital event data that is the subject of evaluation. In some embodiments, the service provider transmits the digital event data immediately after making the request for the global digital threat score. The digital event data may be received at a digital events API of the digital threat mitigation platform that is specifically configured to ingest digital event data and one or more portions of the digital event data throughout the systems of the digital threat mitigation platform.

The collected digital event data from the one or more sources associated with the service provider may include digital event data associated with events, actions, transactions, and various activities occurring via websites, mobile applications, and various digital resources of the service provider. The collected digital event data may be structured and/or organized in a meaningful fashion to include metadata that describes the digital source(s) of the digital event data.

The collected digital event data may additionally include or be appended with user identification data such as data that identifies one or more users and/or one or more user accounts involved in the digital events and/or activities of the collected digital event data transmitted by the service provider. The user identification data may be used by the digital threat mitigation platform to identify and collect additional and/or historical user (or user account) data. Specifically, the digital mitigation platform may convert all or portions of the user identification data into queries for searching one or more database having additional and/or historical user data stored therein. The additional and/or historical user data may be specific to the one or more users and/or user accounts identified in the request from the service provider. Additionally, or alternatively, the additional and/or historical user data may be general digital event data about the users and user accounts of the service provider. The historical user data may be historical digital event data that was submitted in the past by the service provider making the request for the global digital threat score. That is, the historical user data may have been submitted with a historical request by the service provider and stored in one or more databases associated with or maintained by the digital threat mitigation platform. Additionally, or alternatively, the historical user data may originate from other service providers that may have submitted digital event data to the digital threat mitigation platform in the past.

The collected digital event data may include global digital event data acquired from a global digital event database. The global digital event database may include an aggregation of digital event data from a plurality of digital event sources. The plurality of digital event sources may include various other service providers. The global digital event data may be anonymized to prevent leakage of personally identifiable information. This additionally collected global event data may be considered assistive data that may be used as additional input into the machine learning systems of the digital threat mitigation platform to improve the accuracy of the digital threat scoring and predictions thereof.

The type and/or kind of global digital event data collected from the global digital event database may be defined by the sub-requests and the digital threat types identified therein. For instance, if the sub-requests of a service provider received at the events API include two sub-requests for producing digital threat scoring for digital threat type_A and digital threat type_B, the events API may, in turn, convert the respective sub-requests into probes (e.g., convert sub-request digital threat type_B into digital threat type_B probe) that are sent into the global digital event data database to seek and retrieve digital event data that corresponds to or that is assistive in identifying or classifying digital threat type_A and digital threat type_B.

The events API may additionally or alternatively convert the respective sub-requests into respective queries for collecting the additional assistive digital event data. Accordingly, the sub-requests of the requests for global digital threat scoring may act as triggers for collecting additional digital event data and/or assistive data from different sources other than from data repositories maintained or accessible to the service provider.

Accordingly, the collected digital event data may include digital event data originating directly from the service provider as well as global digital event data from other digital event sources (e.g., other service providers, etc.) and historical digital event data associated with one or more users or users' accounts associated with the request for the global digital threat score.

S230, which includes generating a global digital threat score, functions to ingest the collected digital event data and generate a global digital threat score. In generating the global digital threat score, S230 functions to implement an ensemble of machine learning models in a machine learning system capable of determining a likelihood of digital (e.g., online) fraud and/or digital abuse. Each of the machine learning models in the ensemble may be structured to model digital event data uniquely from other machine learning models in the ensemble. While there may be a plurality of differentiated machine learning models defining the ensemble, preferably only one global digital threat score may be generated. That is, each of the machine learning models operate to predict a likelihood of digital fraud and/or digital abuse within the digital event data, however, the ensemble of machine learning models may be configured to output a single global digital threat score for the collected digital event data.

Preferably, S230 functions to return the global digital threat score via a score API of the digital threat mitigation system. A value of the global digital threat score may range between values of zero and one hundred where a higher global digital threat score value indicates a higher likelihood that the digital event and/or a user associated with the digital event data may involve digital fraud and/or digital abuse. Alternatively, in some embodiments, a higher digital threat score value may indicate a lower likelihood of digital fraud and/or digital abuse. Additionally, or alternatively, the global digital threat score may be a probability (e.g., low, intermediate, high or percentage value), a grade, a binary indication (e.g., no fraud, yes fraud, etc.), and the like. Accordingly, the global digital threat score may be represented in any suitable manner that may be interpretable to identify a likelihood of a digital threat being associated with the collected digital event data and additionally, identify a likelihood that a user associated with the digital event data is to commit abuse and/or fraud using an online service or product of a service provider.

S240, which includes generating a digital threat score for a digital abuse type, functions to identify a sub-request for a digital abuse type score and generate a specific digital threat score for the digital abuse type. The digital abuse type score (or interchangeably, the specific digital threat score) is preferably for a specifically identifiable type of digital fraud or digital abuse committed by a user of a service provided by the service provider. A specific digital abuse or digital fraud may include one or more of digital payment abuse, digital content abuse, digital promotion abuse, account abuse, and the like. Additionally, the digital abuse type score may be generated as a combination of the global digital threat score and the specific digital threat score. That is, the specific digital threat score may be generated based on a blend of machine learning models for generating the global digital threat score and machine learning models specific to detecting the digital abuse type. Accordingly, S240 may function to return a single score (e.g., the specific digital threat score) in response to the request having a sub-request for a specific digital score.

S240 preferably functions to generate the digital abuse type score independent of the generation of the global digital threat score. In some embodiments, as discussed further below, the sub-request for a digital threat score for specific digital abuse type may trigger the instantiation of distinct score generation pipeline that enables synchronous generation of the global digital threat score and the (specific) digital threat score for the identified digital abuse type. That is, S240 may function to generate the digital abuse type score in parallel or synchronously with the generation of the global digital threat score. Additionally, or alternatively, S240 preferably functions to use a same dataset (e.g., the same collected digital event data or a same portion thereof) used in generating the global digital threat score to also generate the digital threat score for the specific digital abuse type. Thus, in some embodiments, additional pre-processing of the collected digital event data beyond the processing of the collected event data performed for generating the global digital threat score is not required for the processing pipeline for generating the specific digital threat score. However, in some embodiments, for efficiency of computing multiple specific digital threat scores, the system implementing the method 200 may parse (or filter) from the collected digital event data a subset of collected data that is more likely to be useful in generating the specific digital threat scores. Effectively, the filter may eliminate extraneous data from the collected digital event data that would otherwise have limited to no influence on the specific digital threat scores thereby allowing for increased computational efficiencies. Such embodiments may be very useful for providing timely digital threat scores upon receipt of a synchronous request from a service provider.

In addition to generating the digital abuse type score, S240 may additionally function to identify one or more features of a digital events dataset that function as triggers or signals (or markers) for generating a digital abuse type score. The identified triggers or signals may be identified by a system implementing method 200 as drivers of an adverse or negative digital abuse type score. That is, S240 may function to provide score drivers (e.g., the triggers or signals) that increase or decrease the likelihood of a specific digital abuse type existing in the digital events dataset. The score drivers may be provided with the associated specific digital abuse type score so that together the digital threat as defined by the digital abuse type score may be comprehensible.

Figure 3:
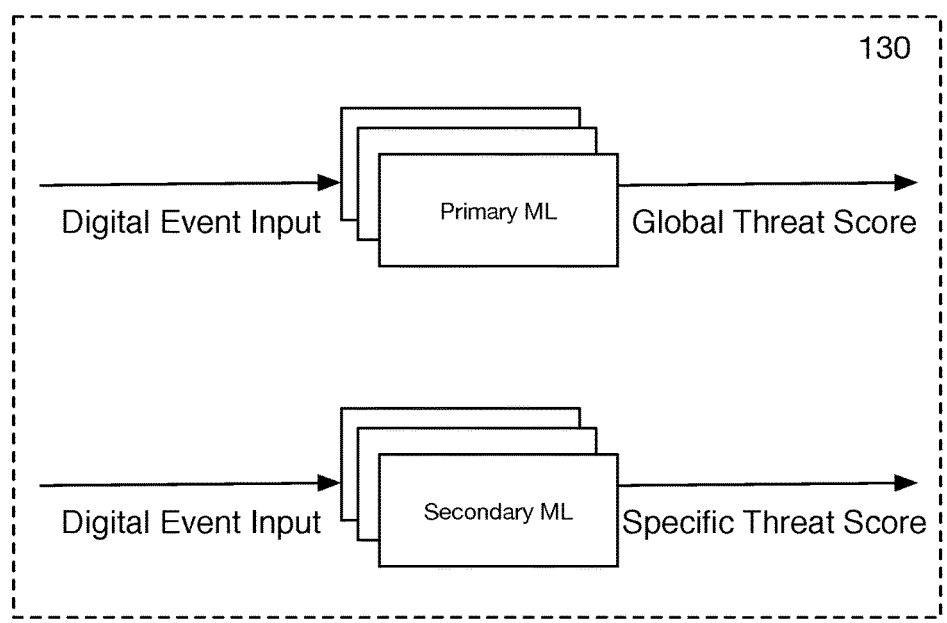
FIG. 3 illustrates an example schematic of a digital threat mitigation platform in accordance with one or more embodiments of the present application.

As shown in FIG. 3, in one implementation of S240, the machine learning system implements a first ensemble of machine learning models for generating the global digital threat score and a second ensemble of machine learning models for generating a digital threat score for an identified digital abuse type. The second ensemble of machine learning models may include a plurality of differentiated machine learning models designed for predicting a likelihood of fraud and/or abuse of online services of a service provider. In such embodiments, each of the plurality of differentiated machine learning models of the secondary machine learning ensemble may produce a distinct prediction for the digital abuse type and based on weightings associated with each of the differentiated models, the digital threat mitigation system determines an aggregate digital threat score for the digital abuse type. In some embodiments, the second ensemble of machine learning models may be designed for generating and/or operate in concert to generate a prediction and/or digital threat score for a single digital abuse type. In one embodiment, the second ensemble of machine learning models may be designed to include multiple machine learning models for generating a digital threat score for several digital abuse types. In such embodiments, the digital abuse types included in the sub-requests may define which of the machine learning models of the second ensemble of machine learning models may be selectively operated or activated by the digital threat mitigation platform for producing a digital threat score for the digital abuse type. For example, sub-requests for digital threat scores for digital abuse type_A and digital abuse type_B may be identified by a system implementing method 200. In such example, a second ensemble of machine learning models may include at least for different machine learning models including machine learning model type_A, machine learning model type_B, machine learning model type_C, and machine learning model type_D. The system identifying only digital threat score requests for digital abuse type_A and type_B would function to operate or activate machine learning model type_A and machine learning model type_B of the second machine learning ensemble and allow machine learning model type_C and machine learning model type_D to remain dormant or unused for this instance. Accordingly, any collected digital event data would be provided as input into the machine learning models for type_A and type_B digital abuse types to thereby generating digital threat scores for type_A and type_B digital abuse types.

Additionally, or alternatively, S240 upon receipt of a sub-request for the digital threat score for an identified digital abuse type, functions to automatically trigger the instantiation of a second machine learning ensemble designed for producing the digital threat score for the identified digital abuse type. In such implementation, the system implementing the method 200 may be configured to detect a sub-request for a specific digital threat score, identify the digital abuse type of the sub-request, and automatically select a machine learning model (or ensemble) from a plurality of available machine learning models for producing the requested digital threat score. In particular, the system may be configured to select the machine learning model that is designed for determining a likelihood of fraud and/or abuse for the digital abuse type identified in the sub-request.

Additionally, or alternatively, a primary or a first machine learning model within the machine learning system that is configured for generating the global digital threat score persists within the system and may be continuously available for producing global digital threat scores. However, the additional or the secondary machine learning models of the machine learning system for producing digital threat scores according to the sub-requests may only be available once a sub-request for a digital threat score is identified by the system. That is, in such embodiments, the secondary machine learning models for producing digital threat scores for digital abuse types may be activated and/or put into operation alongside the primary machine learning model only when a digital threat score for a digital abuse type is requested.

Additionally, or alternatively, the one or more secondary models for generating digital threat scores for digital abuse types may persist continuously alongside the primary machine learning model and operated periodically upon receipt of sub-requests for digital threat scores for one or more digital abuse types.

In a second implementation of S240, upon identifying a sub-request for a digital threat score for a specific digital abuse type, a system implementing method 200 may function to reconfigure the primary machine learning ensemble that generates the global digital threat score. In such second implementation, S240 functions to identify the specific digital abuse type of the sub-request. Once S240 identifies the specific digital abuse type, S240 may identify machine learning parameters that include instructions for modifying or reconfiguring the primary machine learning ensemble to generate a specific digital threat score (in lieu of the global digital threat score) for the identified digital abuse type. Thus, either prior to or after producing the global digital threat score, the primary machine learning model may be modified in this manner.

The instructions for modifying or reconfiguring the primary machine learning ensemble may include instructions for generating weights and/or features to be implemented by the primary machine learning model. Additionally, or alternatively, the instructions may include instructions for retrieving a machine learning parameter set associated with the identified digital abuse type. The machine learning parameter set including weights and/or features to be implemented by the primary machine learning ensemble. Accordingly, in the second implementation, S240 may function to reconfigure the primary machine learning model by augmentation of the weights and/or features to the primary model, substitution/replacement of the weights and/or features into the primary model, reduction of the primary model to match the weights and/or features, reconfiguring existing weights and/or existing features of the primary model to match the weights and/or models for the specific digital abuse type, and the like.

Additionally, or alternatively, S240 may function to duplicate the primary machine learning ensemble and modifying or reconfiguring only the duplicate primary machine learning ensemble. The duplication of the primary machine learning ensemble may be performed upon receipt of the sub-request for the digital threat score for the specific digital abuse type. Alternatively, the duplication of the primary machine learning ensemble may occur subsequent to the generation of the global digital threat score.

In a third implementation of S240, a system implementing the method 200 may generate an ephemeral machine learning ensemble that functions to generate a digital threat score for the identified specific digital abuse type. The ephemeral machine learning ensemble may include a modified or reconfigured primary machine learning ensemble. In such instance, the system implementing the method 200 may function to generate an ephemeral machine learning ensemble by reconfiguring or modifying (or convert) the primary machine learning ensemble (as described above in the second implementation). Subsequent to (or in response to) the generation of the digital threat score by the ephemeral machine learning ensemble for an identified specific digital abuse type, the ephemeral machine learning ensemble may revert to the primary machine learning ensemble used for generating the global digital threat score.

Accordingly, the system may reconfigure the primary machine learning ensemble to be an ephemeral machine learning ensemble according to each sub-request and associated digital abuse type submitted in a request for a global digital threat score.

Alternatively, once the ephemeral machine learning ensemble generates a digital threat score for the specific abuse type, the ephemeral machine learning ensemble may expire causing a deletion or deactivation of the ephemeral machine learning ensemble.

In a fourth implementation of S240, S240 implements a second machine learning model that accompanies the primary machine learning model. The second machine learning model may function to act as a companion machine learning model to the primary machine learning model and functions to infer, based on an input of the collected digital event data, one or more digital abuse types that the collected digital event data (and/or a user involved in the digital event) may most likely be a candidate. The companion machine learning model may, therefore, be able to analyze the collected digital event data and predict which of the plurality of available digital abuse types that may exist in the digital event data.

Figure 5:
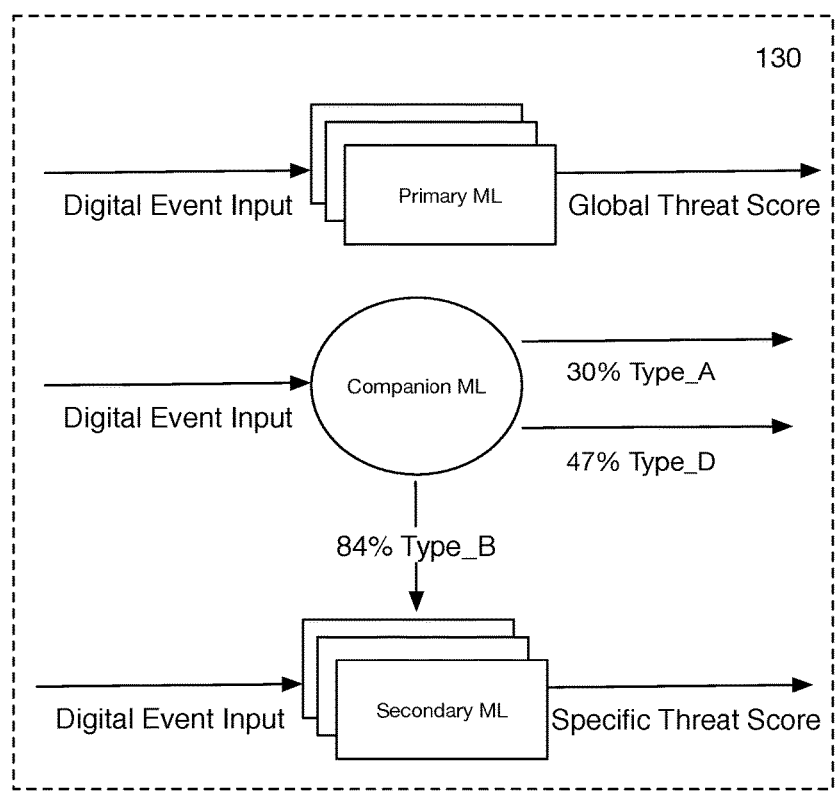
FIG. 5 illustrates an example schematic of a digital threat mitigation platform in accordance with one or more embodiments of the present application.

Additionally, or alternatively, the companion machine learning model may generate a candidacy likelihood for each of the plurality of digital abuse types. For instance, the companion model may analyze the collected digital event data and determine that there is a low likelihood (or probability) of digital abuse type_A, a low likelihood of digital abuse type_B, and a high likelihood of digital abuse type_C in the collected digital event data. In such instance, based on a predetermined threshold, the companion machine learning model may propose generating a digital threat score for digital abuse type_C having a high likelihood of existing in the collected digital event data. Additionally, or alternatively, when the companion machine learning model determines that a candidacy likelihood for a specific digital abuse type (e.g., digital abuse type_B) satisfies or exceeds a high digital threat threshold, the companion machine learning model may function to automatically transmit the specific digital abuse type to a secondary machine learning ensemble for generating a digital threat score for the specific digital abuse type, as shown in FIG. 5. The candidacy likelihood or probability generated by the companion machine learning model may be provided in any suitable manner including as a numerical value (e.g., value between 0 and 100), a percentage (e.g., 0% and 100%), a binary value (e.g., Yes, No), a grade (e.g., A, B, C, D, etc.).

In decisioning which of the plurality of digital abuse types that should be likely candidates for generating a digital threat score, S240 using the companion machine learning model may compare each of the generated candidacy likelihoods (or values) for each of the plurality of digital abuse against one or more candidate threshold. In some embodiments, when the candidacy likelihood for a digital abuse type satisfies or exceeds a candidate threshold, the companion machine learning model may be configured to generate a notification comprising a proposal of the digital abuse type as a likely candidate to receive or have generated a digital threat score. The notification may be transmitted to the service provider and may be preferably presented via a web interface that is in operable communication with the digital threat mitigation platform. Conversely, when the candidacy likelihood for a digital abuse type does not satisfy a candidate threshold, the companion machine learning model may disregard the digital abuse type as a likely candidate for a digital threat score. However, in some embodiments, when the candidacy likelihood for a given digital abuse type may be sufficiently close to a candidate threshold such that the companion machine learning model may redirect its analysis of the digital abuse type to a review queue for decisioning regarding whether a digital threat score should be generated for the digital abuse type.

Figure 4:
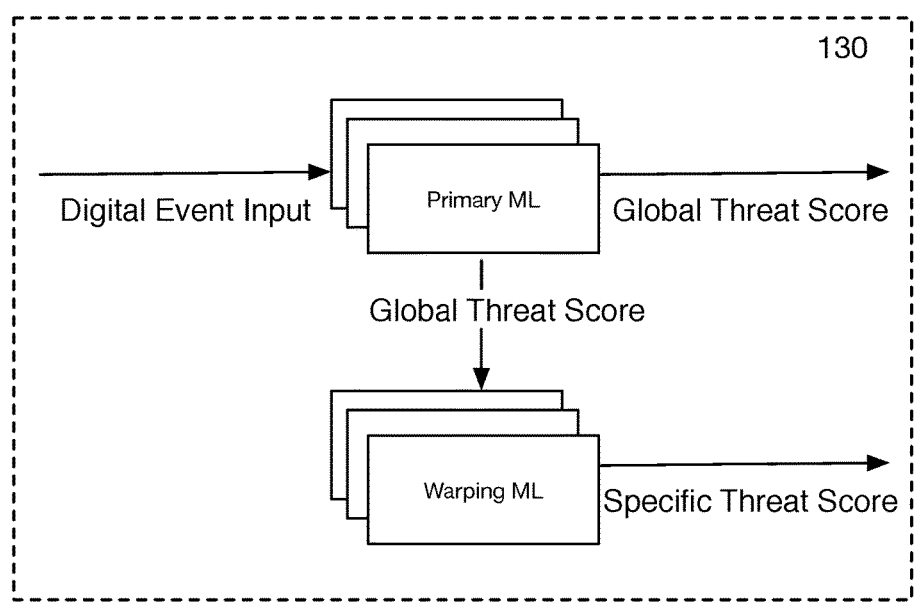
FIG. 4 illustrates an example schematic of a digital threat mitigation platform in accordance with one or more embodiments of the present application.

Additionally, or alternatively, for each of the digital abuse types that the companion machine learning model indicates as being a likely candidate for a digital threat score, S240 may function to generate a respective digital threat score by warping the global digital threat score generated by the primary machine learning ensemble, as shown in FIG. 4. Thus, in such embodiments, S240 uses the global digital threat score as input into a warping system (implemented by one or more computing servers or the like) of a digital threat mitigation platform to generate each of the respective digital threat scores. Additionally, or alternatively, S240 may function to warp the primary machine learning ensemble to generate a secondary machine learning model that is configured to generate the digital threat score for one or more digital abuse types.

Figure 6:
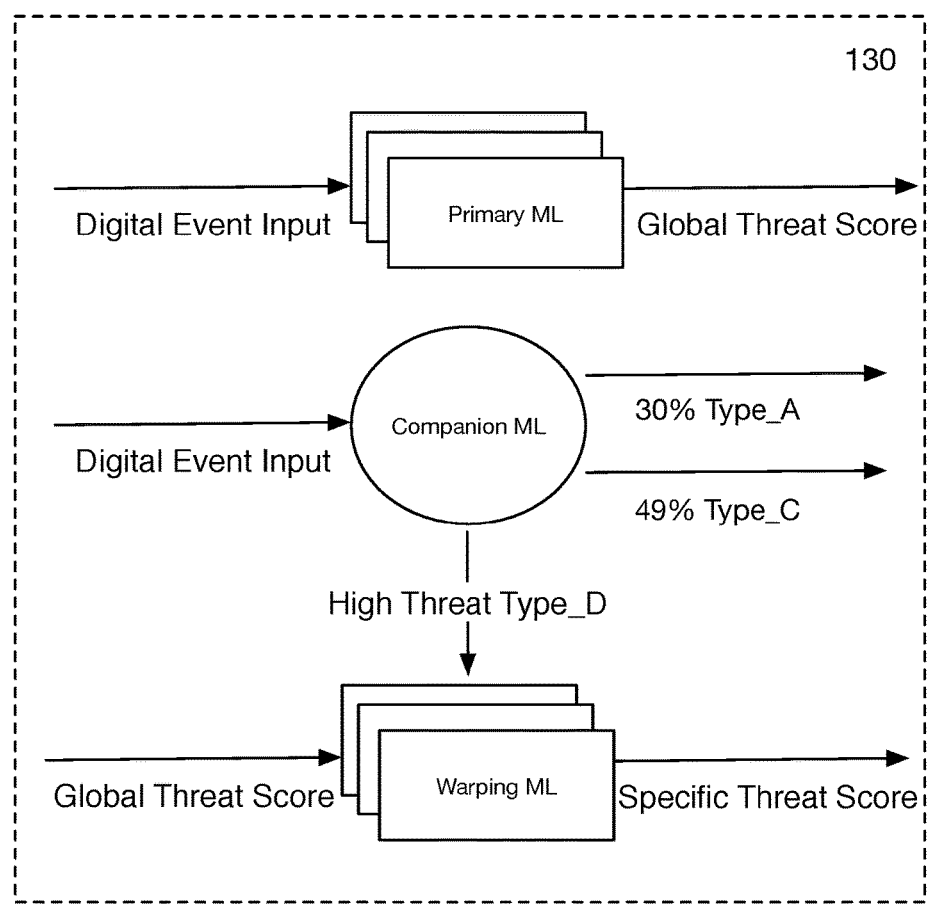
FIG. 6 illustrates an example schematic of a digital threat mitigation platform in accordance with one or more embodiments of the present application.

Upon receiving the digital global threat score at the warping system, S240 may function to identify warping parameters for each respective digital abuse types. The warping parameters may include one or more predetermined instructions for modifying the global digital threat score for achieving a digital threat score for a digital abuse type associated with the subject warping parameters. S240 may then apply the warping parameters to the digital global threat score input to convert the digital global threat score into a specific digital threat score for a digital abuse type. For instance, the primary machine learning model may generate a global digital threat score of 87 (on a scale of 0 to 100) for collected digital event data and the companion machine learning model may determine a candidacy likelihood value of "high" for digital abuse type_D. In such instance, the companion machine learning model would recommend generating a score for digital abuse type_B and consequently, a warping system would warp the global digital threat score of 87 using warping parameters for digital abuse type_D, as shown in FIG. 6. As output, the warping system may then determine as output a specific digital threat score of 71 (on a scale of 0 to 100) for digital abuse type_D.

In some embodiments, the companion machine learning model may be implemented when a request for a digital global threat score does not include a sub-request for a digital threat score for a specific digital abuse type. In such case, the digital threat mitigation platform implementing one or more portions of method 200 may automatically trigger (based on an identification of no sub-requests) the implementation of the companion machine learning model alongside the primary machine learning model to determine whether there are candidates for digital threat scores among the plurality of digital abuse types.

Additionally, or alternatively, the companion machine learning model may be automatically implemented when it is determined that the service provider providing or associated with the collected digital event data may be susceptible to one or more digital abuse types based on historical data associated with the service provider or based on analytics and/or historical data associated with the type of online services offered by the service provider. For instance, if it is determined by the digital threat mitigation platform that a service provides a website with payment functionality for digital services, the digital threat mitigation platform being aware of high probabilities of digital payment abuse for typical websites having payment functionality may automatically implement the companion machine learning model to determine whether collected digital event data associated with the service provider is a likely candidate for generating a digital threat score for payment abuse.

S250, which includes generating a plurality of digital threat scores for a plurality of cognate digital abuse types, functions to opportunistically identify cognate digital abuse types of digital abuse types identified in one or more sub-requests and correspondingly, generate a digital threat score for each of the cognate digital abuse types.

S250 functions to analyze the request for a digital global threat score to identify the one or more sub-requests for digital threat scores for specific digital abuse types. For each identified digital abuse type, S250 functions to analyze the digital abuse type to determine whether there are one or more closely related other digital abuse types for which no sub-request has been presented. In analyzing the digital abuse type, S250 may function to identify closely related other digital abuse types based on a mapping of digital abuse types. The mapping of the digital abuse types may include every known digital abuse type represented as individual nodes. Between a pair of nodes may be a link or connector indicating a relationship between the pair of nodes. Each link within the mapping of digital abuse types may be associated with or provided a relationship score or similar value indicating how closely related the digital abuse types represented by the two nodes might be. Alternatively, the mapping may not include any relationship scoring for a link between nodes. Accordingly, S250 may determine cognate digital abuse types based on an existence of a link or a relationship score of the link between a digital abuse type associated with a sub-request and another digital abuse type (not identified in any sub-requests).

Once cognate digital abuse types are identified, S250 may additionally generate a digital threat score for each cognate digital abuse type. In this way, it may be determined whether an unaddressed digital abuse type poses a digital threat with the collected digital event data.

S260, which includes implementing digital threat mitigation protocols, functions to in response to generating both the global digital threat score and the specific digital threat score for the digital abuse type, implementing one or more digital threat mitigation protocols via the one or more online services when the global digital threat score or the specific digital threat score satisfy or exceed a digital threat threshold, wherein the one or more digital threat mitigation protocols that prevent or eliminate the specific digital abuse type.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A machine learning system that predicts and/or classifies digital fraud or digital abuse, the system comprising:
one or more computing server devices that implement a remote machine learning service that collects, via one or more networks, digital event data associated with one or more online services of a service provider, wherein the remote machine learning service implements:
a machine learning system that:
implements a first machine learning model comprising a global scoring machine learning model to generate an output of a global digital threat score for an online activity based on an input of the collected digital event data, wherein the global digital threat score indicates a likelihood that the online activity associated with the digital event data involves digital fraud and/or digital abuse;
implements a second machine learning model comprising a companion machine learning model that generates a category inference of a category of digital fraud or a category of digital abuse from a plurality of digital fraud or digital abuse categories based on the digital event data, wherein the machine learning service returns the global digital threat score with a proposal for generating a digital fraud or a digital abuse category-specific threat score based on the category inference satisfying a predetermined threshold that indicates a high likelihood of an existence of specific category of digital fraud or digital abuse within the online activity;
selects a third machine learning model comprising a category-specific machine learning model from an ensemble of digital fraud or digital abuse machine learning models based on the category inference generated by the second machine learning model, wherein the ensemble of digital fraud or digital abuse machine learning models comprise a plurality of disparate digital fraud or digital abuse category-specific machine learning models;
implements the selected third machine learning model to generate a digital fraud or digital abuse category-specific threat score based on the digital event data; and
implements one or more online risk mitigation protocols that reduce or eliminate the specific category of digital abuse or digital fraud based on the generated digital fraud or the digital abuse category specific threat score.

2. The system of claim 1, wherein
the global digital threat score is agnostic to a category of digital abuse or a category of digital fraud.

3. The system of claim 1, wherein
the first machine learning model and the second machine learning model are different.

4. The system of claim 1, wherein
digital fraud or digital abuse category-specific threat score indicates a probability or a likelihood that the online activity involves the category of digital fraud or the category of digital abuse of the category inference.

5. The system of claim 1, further comprising:
an application programming interface (API) that is in operable communication with the remote machine learning service and that is configured to generate a request for the global digital threat score and/or the digital fraud or digital abuse category-specific threat score.

6. The system of claim 5, wherein
the machine learning system receives via the API a multi-part request comprising (i) a primary request for the global digital threat score and (ii) a secondary request for the digital fraud or digital abuse category-specific threat score.

7. A method for predicting and/or classifying digital fraud or digital abuse, the method comprising:
at a remote machine learning service:
implementing a first machine learning model comprising a global machine learning model to generate an output of a global digital threat score for an online activity based on an input of the collected digital event data, wherein the global digital threat score indicates a likelihood that the online activity associated with the digital event data involves digital fraud and/or digital abuse;

implementing a second machine learning model comprising a companion machine learning model that generates a category inference of a category of digital fraud or a category of digital abuse from a plurality of digital fraud or digital abuse categories based on the digital event data, wherein the machine learning service returns the global digital threat score with a proposal for generating a digital fraud or a digital abuse category-specific threat score based on the category inference satisfying a predetermined threshold that indicates a high likelihood of an existence of specific category of digital fraud or digital abuse within the online activity;

selecting a third machine learning model comprising a category-specific machine learning model from an ensemble of digital fraud or digital abuse machine learning models based on the category inference generated by the second machine learning model, wherein the ensemble of digital fraud or digital abuse machine learning models comprise a plurality of disparate digital fraud or digital abuse category-specific machine learning models;

implementing the selected third machine learning model to generate a digital fraud or a digital abuse category-specific threat score based on the digital event data; and implementing one or more online risk mitigation protocols that reduce or eliminate the specific category of digital abuse or digital fraud based on the generated digital fraud or the digital abuse category specific threat score.

8. The method of claim 7, wherein
the global digital threat score is agnostic to a category of digital abuse or a category of digital fraud.

9. The method of claim 7, further comprising:
identifying one or more features of the digital events data that operate as one or more adverse triggering signals for implementing the second machine learning model for generating the digital fraud or digital abuse category-specific threat score.

10. The method of claim 9, further comprising:
returning the one or more adverse triggering signals together with the digital fraud or digital abuse category-specific threat score.

11. The method of claim 7, further comprising:
identifying user identification data that identifies a user involved in the online activity;
converting the user identification data associated with the digital events data into queries used to collect historical user digital events data associated with the user involved in the online activity from one or more databases of the remote machine learning service; and
providing the historical user digital events data as additional input into the global scoring machine learning model when generating the global digital threat score.

12. The method of claim 7, wherein
the global digital threat score comprises a binary indication of an existence of digital fraud or digital abuse within the online activity.

13. The method of claim 7, further comprising:
implementing an application programming interface (API) that is in operable communication with the remote machine learning service and that is configured to generate a request for the global digital threat score and/or the digital fraud or digital abuse category-specific threat score.

14. The method of claim 13, wherein
the machine learning service receives via the API a multi-part request comprising (i) a primary request for the global digital threat score and (ii) a secondary request for the digital fraud or the digital abuse category-specific threat score.

15. The method of claim 14, wherein:
the sub-request for the digital threat score for the digital fraud or the digital abuse category-specific threat score triggers an instantiation of a distinct category-specific score generation pipeline for the digital fraud or the digital abuse category-specific threat score that enables synchronous generation of the global digital threat score and the digital fraud or the digital abuse category-specific threat score.

16. The method of claim 7, wherein
the second machine learning model is automatically implemented when it is determined that the service provider associated with the collected digital event data is susceptible to one or more categories of digital abuse or digital fraud based on historical data associated with the service provider.

17. The method of claim 7, wherein:
the one or more categories of digital fraud or digital abuse includes one or more of digital payment abuse, digital content abuse, digital promotion abuse, digital account takeover, and digital account abuse.

* * * * *